United States Patent
Hodges

(10) Patent No.: US 6,636,940 B1
(45) Date of Patent: Oct. 21, 2003

(54) TASK CONTROL FOR HIGH LEVEL COMMANDS IN DISK DRIVES

(75) Inventor: Paul Hodges, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/453,382

(22) Filed: Dec. 2, 1999

(51) Int. Cl.[7] .............................................. G06F 13/20
(52) U.S. Cl. .............................. 711/112; 710/5; 710/74
(58) Field of Search ............................ 711/112; 710/5, 710/74

(56) References Cited

U.S. PATENT DOCUMENTS

| | | | |
|---|---|---|---|
| 5,257,367 A | * 10/1993 | Goodlander et al. | 707/204 |
| 5,325,505 A | 6/1994 | Hoffecker et al. | 707/101 |
| 5,355,486 A | 10/1994 | Cornaby | 709/102 |
| 5,555,390 A | 9/1996 | Judd et al. | 711/112 |
| 5,613,141 A | 3/1997 | Szatkowski et al. | 710/2 |
| 5,640,504 A | 6/1997 | Johnson, Jr. | 714/4 |
| 5,640,596 A | * 6/1997 | Takamoto et al. | 710/21 |
| 5,664,145 A | 9/1997 | Apperley et al. | 711/117 |
| 5,696,930 A | * 12/1997 | Garetz et al. | 710/3 |
| 5,708,848 A | 1/1998 | Sangveraphunsiri et al. | 710/21 |
| 5,758,187 A | 5/1998 | Young | 710/24 |
| 5,835,694 A | 11/1998 | Hodges | 714/6 |

OTHER PUBLICATIONS dpANS NCITS 306–199X, Project 996D, Information Technology–SCSI–3 Block commands (SBC), Nov. 13, 1997.

* cited by examiner

Primary Examiner—Reginald G. Bragdon
(74) Attorney, Agent, or Firm—Ohlandt, Greeley, Ruggiero & Perle, L.L.P.; Noreen Krall

(57) ABSTRACT

High level commands for a disk drive are processed by a task manager program that parses them into low level subcommands (e.g., SCSI commands). The low level subcommands are. then presented to the command execution means of the disk drive for execution. The parsing or sub tasking of a high level command into a number of low level commands permits the efficient handling of subcommands that must be deferred until other subcommands are executed and of third party XOR operations.

36 Claims, 6 Drawing Sheets

TCB TEMPLATE FOR XDWRITE EXTENDED ~80

| Tag | Status | SCSI Address | Operation | Block Address | Prerequisites |
|---|---|---|---|---|---|
| HLCD | 01 | Initiator | XDWrite | LBA/CD | 03, 06 |
| 01 | 01 | Local Drive | Read | LBA/CD | None |
| 02 | 01 | Initiator | Transfer New Data to Buffer | NA | None |
| 03 | 00 | Local Drive | Write | LBA/CD | 01, 02 |
| 04 | 00 | Local Drive | Exclusive Or Old Data and New Data | NA | 01, 02 |
| 05 | 01 | Secondary Address From CDB | XPWrite | Secondary Address From CDB | None |
| 06 | 00 | Secondary Address From CDB | Transfer Exclusive OR Data | NA | 04, 05 |

FIG. 5

| Code | Status |
|---|---|
| 00 | Wait |
| 01 | Startable |
| 10 | Started |
| 11 | Complete |

FIG. 6

TASK CONTROL FOR HIGH LEVEL COMMANDS IN DISK DRIVES

BACKGROUND OF THE INVENTION

1. Field of the Invention

This invention relates to disk. drive storage for computer systems and, more particularly, to a method and a controller for processing high level commands from a host computer that require multiple seeks to one or more disk drives.

2. Description of the Prior-Art

It is known to configure multiple disk drives into a RAID (Redundant Array of Inexpensive disks) array. Array controllers have historically performed a cumulative exclusive OR (XOR) operation to generate parity data and accomplish its rewrite to parity spaces on the individual disk drives. The prior art has also performed the cumulative XOR operation in the disk drives themselves.

Performing the XOR operation in the disk drive may result in a reduced number of data transfers across an interconnecting network. When an XOR operation is performed by a storage array controller, four data transfer operations are required for a typical update write sequence and the array controller performs two XOR operations during the sequence. If the array controller is used in a supervisory mode (with the disk drives performing the XOR operations), only three data transfer operations are required between the array controller and the individual disk drives, i.e., a write transfer to the disk drive containing the protected data, a read transfer from the disk drive containing the protected data and a write transfer to the device containing the parity data. By performing the XOR operation in a disk drive, the array controller need not perform any XOR operations.

Controllers for disk drives are known that execute low level commands. Two examples are a disk drive utilizing a SCSI (Small Computer System Interface) controller. On the other hand, a high level command requires two or more actions that otherwise would be controlled by separate SCSI commands.

A number of high level commands, proposed by the T10 committee of NCITS for an American National Standard are described in a document entitled dpANS NCITS 306-199X, Project 996D, Information Technology-SCSI-3 Block commands (SBC), dated Nov. 13, 1997. The proposed high level commands include, for example, XDWRITE EXTENDED, XPWRITE, REGENERATE AND REBUILD. Each of these commands requires a third party XOR operation.

Current SCSI disk drives can only accept low level commands, such as SCSI commands, and are incapable of processing high level commands.

Thus, there is a need for a method and controller that can process high level commands for disk drives.

SUMMARY OF THE INVENTION

The present invention processes high level commands with a method and controller that parses them into low level subcommands that can be executed by low level command execution means contained in a disk drive. The high level commands supplied by a host computer contain command information that identifies the high level command type and the identities of a local drive and a peer drive.

The method of the invention forms a task control block for each high level command received from the host computer. Each of the task control blocks includes the command information and a list of low level subcommands for the high level command type. When one of the task control blocks is selected, its low level subcommands are presented for execution by the command execution means of the local disk drive or of the peer disk drive. Status of the low level subcommands of the selected task control block is updated as the command execution means of the peer drive or the local drive reports completion of the low level subcommands.

When all of the low level subcommands for the selected high level command have been completed, the host computer is notified that the selected high level command has been completed. The process is repeated for other task control blocks that have been formed.

The execution of a low level subcommand is deferred if another low level subcommand must be executed first. In the XDWRITE EXTENDED command, for example, a write of new data is deferred until new and old data have been transferred to a buffer, an XOR subcommand is deferred until the old and new data are available, and a parity write subcommand to a peer drive is deferred until an XOR subcommand has been executed.

The controller of the present invention includes a processor, a memory, and a task manager program. The task control program controls the processor to perform the steps of the method.

BRIEF DESCRIPTION OF THE DRAWING

Other and further objects, advantages and features of the present invention will be understood by reference to the following specification in conjunction with the accompanying drawings, in which like reference characters denote like elements of structure and:

FIG. 5 depicts a task control block template of the FIG. 4 drive controller;

FIG. 6 is a table depicting the status codes of low level subcommands of the task control block of FIG. 5.

DESCRIPTION OF THE INVENTION

Figures 1, 2:
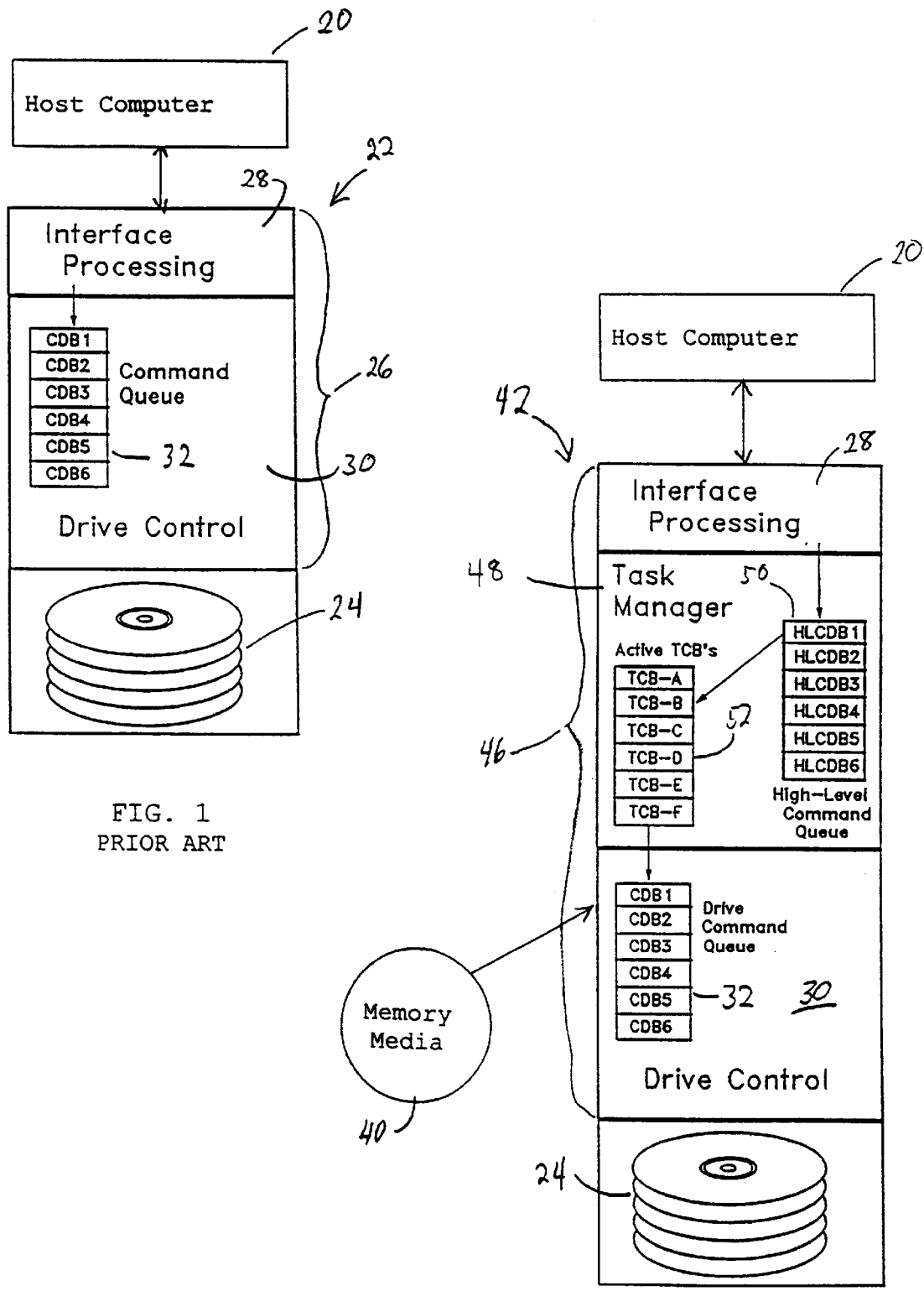
FIG. 1 is a block diagram of a prior art disk drive.
FIG. 2 is a block diagram of a disk drive according to the present invention.

Referring to FIG. 1, a host computer 20 is shown interconnected with a prior art disk drive 22. Disk drive 22 includes a disk storage device 24 and a disk drive controller 26. Disk drive controller 26 includes an interface processing program 28 and a drive control program 30. Interface processing program 28 processes each command received from host computer 20 and supplies it to drive control program 30. Drive control program 30 places the command in a command queue 32 and executes commands one at a time. The order of execution may be rearranged by drive control program 30 to improve overall performance. When a command has been executed, drive control program 30 notifies host computer 20 that that that command has been completed.

The commands require disk drive 22 to perform read and write operations that involve data accesses (seeks) of storage locations of disk storage device 24. The commands are low level commands, for example SCSI commands, organized by an application running on host computer 20. These low level commands are generally executed sequentially by drive control program 30.

Referring to FIG. 2, a disk drive 42 according to the invention is interconnected with host computer 20. Disk drive 42 includes disk 24 and a disk drive controller 46. Disk drive controller 46 includes interface processing program 28, drive control program 30 and a task manager program 48. Task manager program 48 is inserted between interface processing program 28 and drive control program 30 to receive high level commands as well as low level SCSI commands.

Task manager program 48 utilizes a high level command queue 50 to enqueue these commands. Task manager program 48 utilizes an active task control block (TCB) list 52 to parse the high level commands into SCSI or other low level commands. Task manager program 48 distributes the low level SCSI commands or low level subcommands to drive control program 30 or its peer disk drives in an array. For example, drive control program 30 enqueues these low level commands in its drive command queue 32 for execution as though received directly from host computer 20 via interface processing program 28.

Although interface processing program 28, drive control program 30 and task manager program 48 are shown as already loaded into a memory of disk controller 46, it will be understood by those skilled in the art that these programs and any others utilized by disk drive controller 42 may be loaded from a memory media 40.

Figure 3:
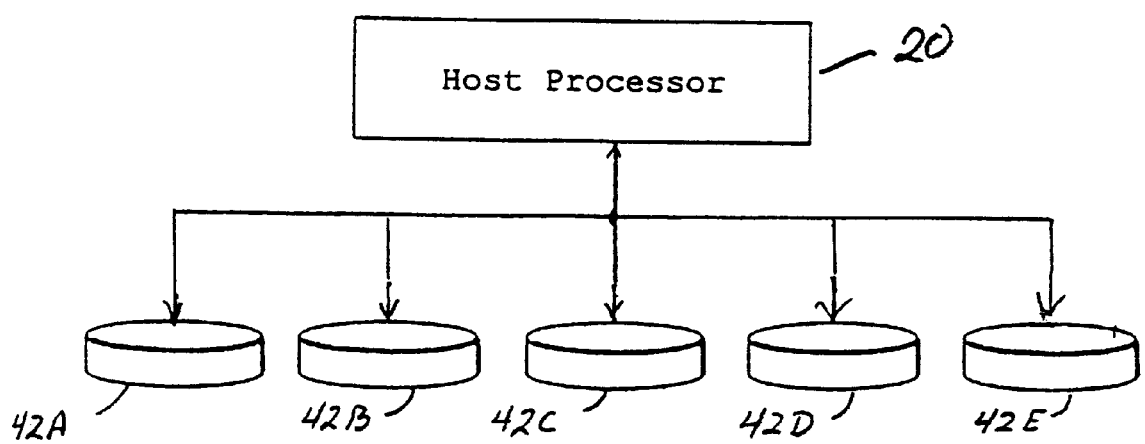
FIG. 3 is a block diagram of an array configuration of a plurality of the FIG. 2 disk drives.

Referring to FIG. 3, a plurality of disk drives 42A, 42B, 42C, 42D and 42E, each being substantially identical to disk drive 42 of FIG. 2, are shown interconnected with host computer 20 in a disk storage array. Host computer 20 includes one or more CPUs upon which are running one or more application programs. As an application program requires read or write operations to be performed on disk drives 42A through 42E, it issues high level commands to the disk drive that contains data to be read or modified.

Figure 4:
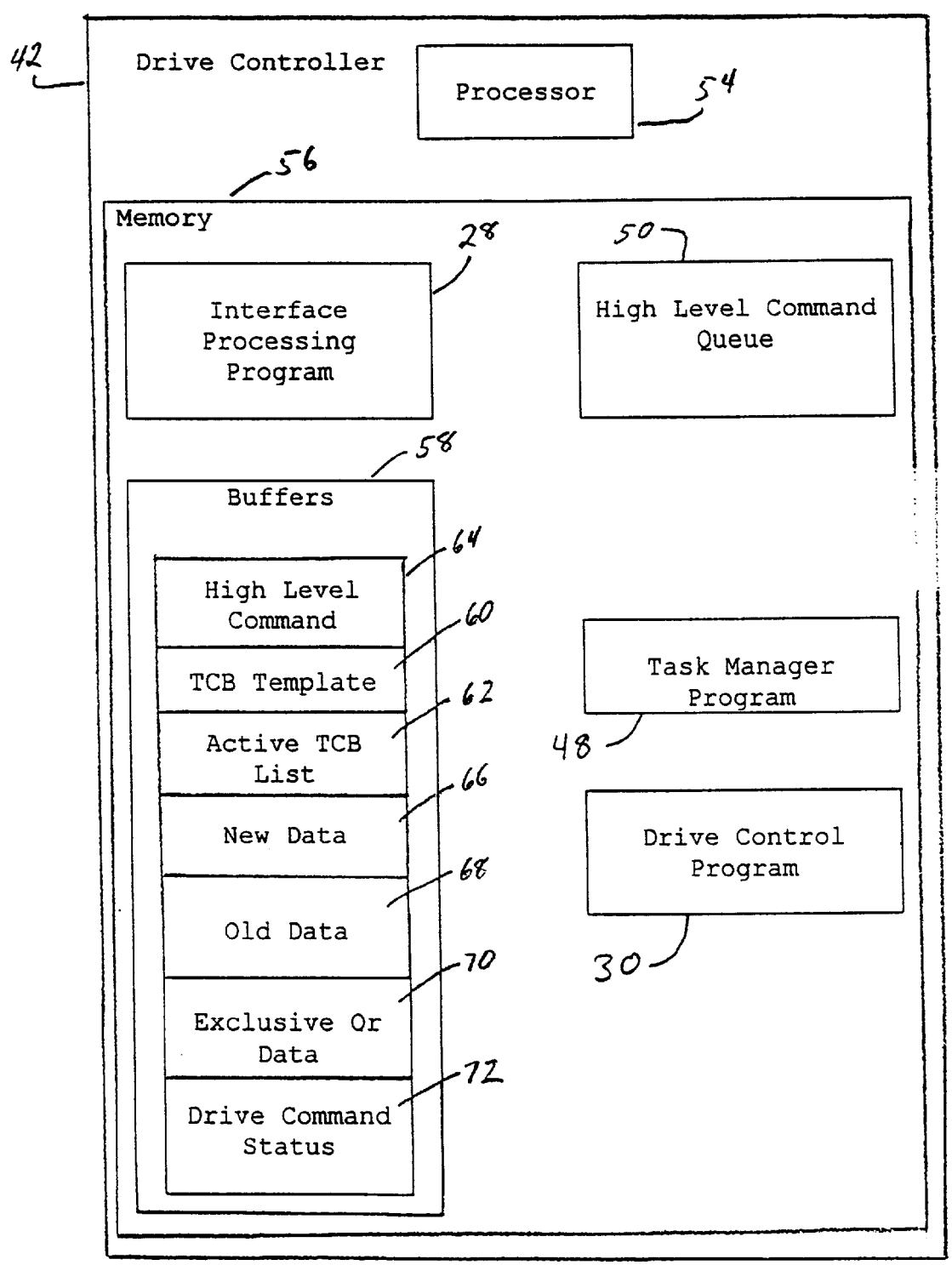
FIG. 4 is a block diagram of the drive controller of the FIG. 2 disk drive.

Referring to FIG. 4, disk drive controller 42 includes a processor 54 and a memory 56. Memory 56 contains interface processing program 28, drive control program 30, task manager program 48, high level command queue 50 and a set of buffers 58. Buffers 58 include a TCB template buffer 60, an active TCB list buffer 62, a high level command buffer 64, a new data buffer 66, an old data buffer 68, an XOR buffer 70 and a drive command status buffer 72. Processor 54, interface processing program 28 and drive control program 30 are conventional items.

Task manager program 48 utilizes high level command queue 50 and buffers 58 to process high level commands. Task manager program 48 parses the high level commands into a sequence of low level subcommands and delivers the low level subcommands and other low level commands to drive control program 30. Task manager program 48 utilizes TCB template buffer 60 to form a TCB (task control block) that lists the low level subcommands corresponding to a high level command received from host computer 20. To this end, TCB template buffer 60 includes a TCB template for each high level command. When a TCB is formed, it is stored in active TCB buffer 62 and added to active TCB list 52.

Referring to FIG. 5, a TCB template 80 is shown, by way of example, for an XDWRITE EXTENDED high level command. TCB template 80 is stored in TCB template buffer 60 together with other templates for the other high level commands, such as XPWRITE, REGENERATE AND REBUILD. TCB template 80 includes a plurality of rows that identify the high level command and the low level subcommands needed to execute the high level command. Each of the rows is divided into columns that define fields that are contained in each row. Thus, a tag field 82 identifies the specific high or low level command. The high level command is described by the topmost row and is identified by tag HLCD that is assigned by host computer 20 and transmitted with the high level command. The tags 01 through 06 identify the low level subcommands. The rows will hereafter be identified by their tags.

A status field 84 identifies the status of the command. With reference to FIG. 6, four status codes are used for wait (00), startable (01), started (10) and complete (11). Thus, the HLCD high level command with a status code of 01 is startable.

A SCSI address field 86 identifies an address associated with the high level command or the subcommands. For the HLCD high level command, the address is the initiator, which is the application running on host computer 20. For the subcommands, the address is the target to which the subcommand is directed. An operation field 88 identifies the operation to be performed. Thus, the operation is XDWRITE EXTENDED for the HLCD high level command. A block address field 90 identifies the address and length of the data.

A prerequisites field 92 identifies which if any other low level subcommands in template 80 must be completed as a prerequisite to starting or completing the command for a particular row. Thus, the HLCD command is not completed until subcommands 03 and 06 are completed and subcommand 03 is not started until subcommands 01 and 02 are completed.

When disk drive controller 42 receives an XDWRITE EXTENDED command from host computer 20, task manager program 48 uses template 80 and information contained in the high level command to form an active TCB that is stored in active TCB buffer 62. This involves completing each command row by filling in the SCSI address fields 86, block address fields 90 and any additional tag information (e.g., one or more characters that may identify the running application). Task manager program 48 processes active TCBs in active TCB buffer 62 by sending startable commands to the local drive or to a peer drive according to the SCSI address 86.

Still referring to FIG. 5, the low level subcommand sequence for the XDWRITE EXTENDED high level command will be described. The XDWRITE EXTENDED command requires six low level subcommands 01 through 06. Low level subcommands 03 and 04 cannot be started until sub commands 01 and 02 have been completed and, therefore, have a status of wait (00). Low level subcommand 06 similarly has a wait status because it cannot be started until low level subcommands 04 and 05 have been completed.

Task manager program 48 sends startable low level subcommands to drive controller program 30 of the local drive or to a peer drive and updates the sent low level subcommand status from startable to started. When a completed status for a low level subcommand is received from drive control program 30 or a peer drive, task manager program 48 updates the status of the low level subcommand from started to complete. For example, drive control program 30 may post completed status of a low level subcommand in drive command status buffer 72. Notice of completion status from a peer drive will be communicated to disk drive 42, processed by interface processing program 28 and handed over to task manager program 48.

Low level subcommand 01 reads the data from the local drive per the address and block length information contained in block address field 90 and places the read data in old data buffer 68. Low level subcommand 02 transfers the new data supplied by the initiator to new data buffer 66.

When task manager program 48 updates the status of low level subcommands 01 and 02 to completed, it also updates the status of low level subcommands 03 and 04 from wait to startable. Low level subcommand 03 writes the new data to the local drive using the address and block length information contained in block address field 90. Low level subcommand 04 performs an XOR operation of the new data and the old data contained in new and old data buffers 66 and 68 to generate parity data. The parity data is placed in XOR data buffer 70. Low level subcommand 05 sends a low level XPWrite command to the peer drive using a secondary address for the peer drive. The peer drive stores parity data for the data being written to the local drive. This secondary address was obtained from the XDWRITE EXTENDED command when the TCB was formed.

As the status of low level subcommands 04 and 05 is updated to completed, task manager 48 updates the status of low level subcommand 06 from wait to startable. Low level subcommand 06 transfers the XOR parity data from XOR data buffer 70 to the peer disk drive.

A peer drive treats the local drive as the initiator of the XPWRITE command and when it is completed, returns a completed status to the local drive. When this complete status is received, task manger program 48 updates the status of low level subcommand 06 from started to completed. Task manager program 48 then notifies the initiator of the high level command that it is completed.

For the above example of an XDWRITE EXTENDED command, low level subcommands 01 and 02 must be completed before low level subcommands 03 and 04 can be started and low level subcommands 04 and 05 must be completed before low level subcommand 06 can be started. Dispatching of high level commands from high level command queue 50 is managed by task manager program 48 in such a manner that deadlocks and data corruption are prevented. Maintaining a separate queue for high level commands enables such management, the details of which depend upon the specifics of the high level commands to be implemented. For example, co-pending application Ser. No. 08/940,105, now U.S. Pat. No. 6,092,215, for "System and Method for Reconstructing Data in a Storage Array", by P. Hodges and R. W. Shomler, describes drive level management for the XDWRITE EXTENDED, XPWRITE, REGENERATE and REBUILD commands.

Figure 7:
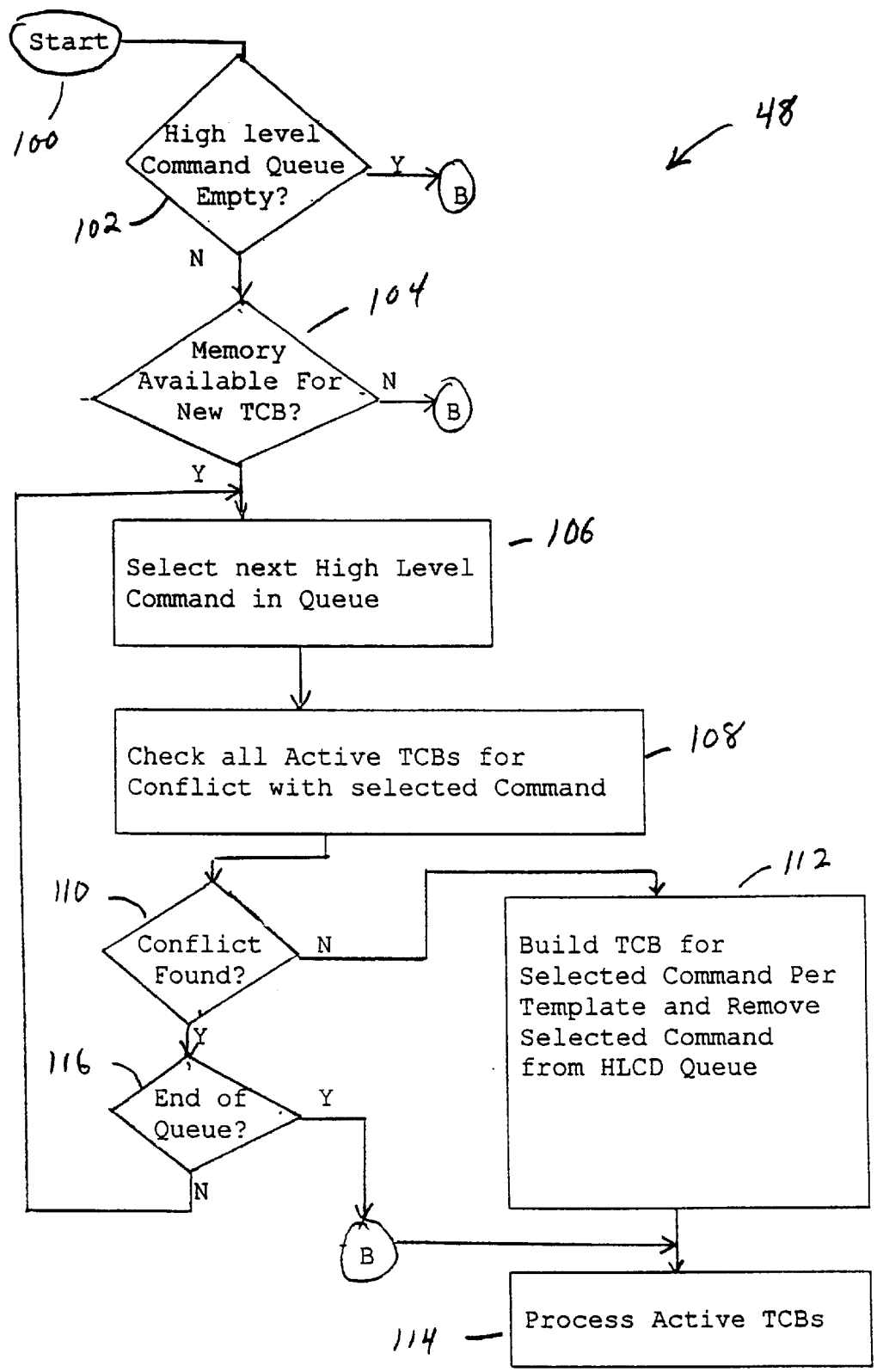
FIGS. 7 and 8 are flow diagrams of the processes performed by the task manager program of the FIG. 4 drive controller.

Referring to FIG. 7, task manager program 48 is entered from a start step 100 as, for example, when disk drive 42 is powered up or when processing of active TCBs has ended. Step 102 determines if high level command queue 50 is empty. If so, step 114 is performed to process active TCBs. If step 102 determines that high level command queue 50 is not empty, step 104 determines if buffer memory is available for a new TCB. If not, step 114 is performed to process active TCBs. If step 104 determines that there is enough buffer memory for a TCB, step 106 selects the next high level command in high level command queue 50. Step 108 then checks all active TCBs for conflict with the selected command. For example, a conflict would exist if the selected command and an active TCB require updates of the same data.

Step 110 determines if a conflict is found. If not, step 112 builds a TCB For the selected command with a template from TCB template buffer 60, stores the new TCB in active TCB buffer 62, adds the new TCB to the active TCB list 62 and removes the selected command from the high level command queue 50. Step 114 then processes active TCBs. If step 110 determines that a conflict is found, step 116 determines if the selected command is the end of high level queue 50. If so, step 114 processes active TCBs. If not, step 106 is performed again.

Figure 8:
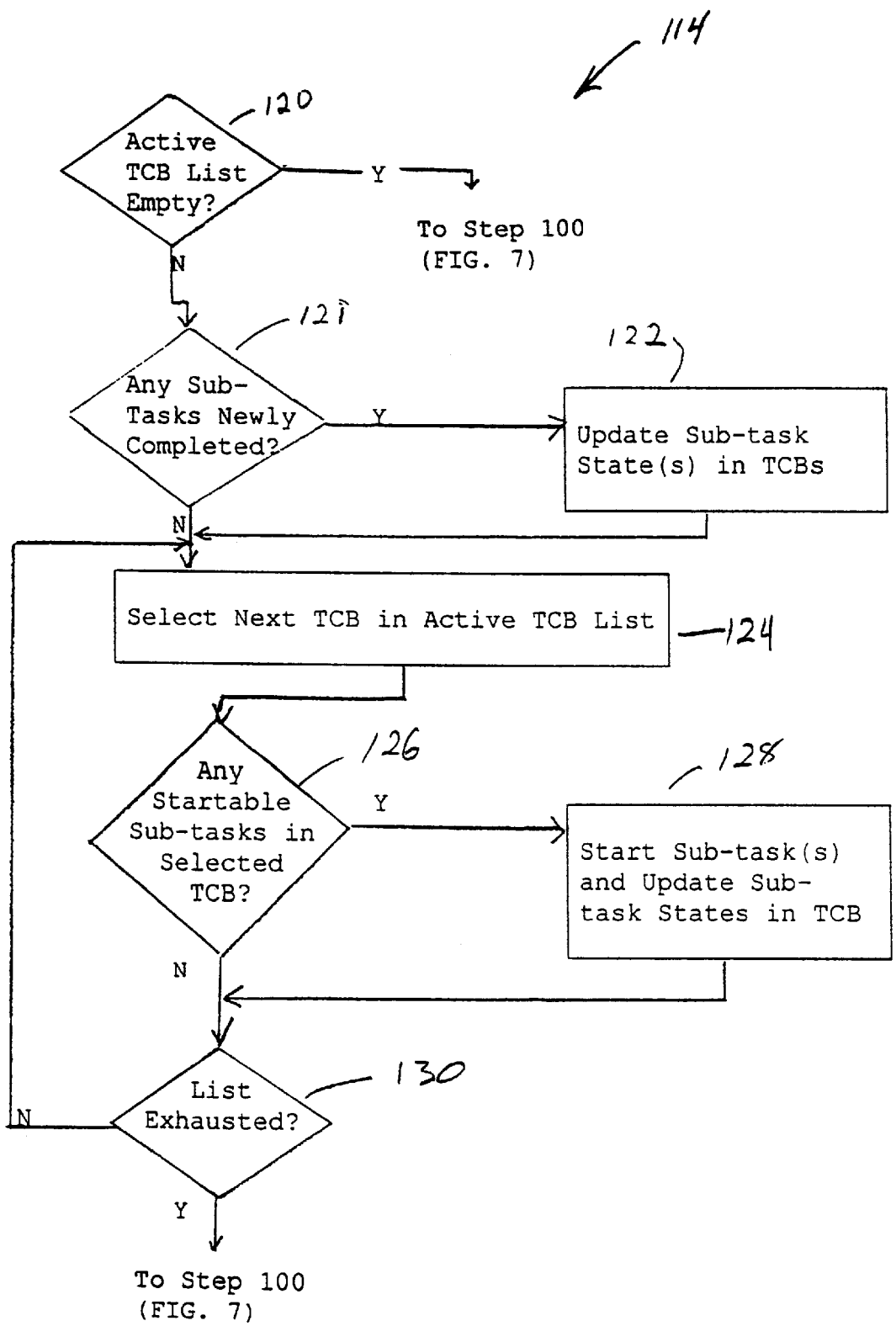

Referring to FIG. 8, step 114 is shown to start with step 120 that determines if the active TCB list 52 is empty. If so, step 114 ends and control returns to step 100 (FIG. 7) for processing high level commands. If step 120 determines that active TCB list 52 is not empty, step 121 determines if there are any sub commands that are newly completed. That is, drive command status buffer is checked for completed status of low level subcommands that may have been posted by drive control program 30 or from a peer drive. If so, step 122 updates the low level subcommand status of the completed low level subcommands and of any waiting low level subcommands, if necessary, in the active TCB buffer 62.

If step 121 determines that there are no newly completed low level subcommands or when step 122 is completed, step 124 selects the next TCB in active TCB list 52. Step 126 determines if the selected TCB has any startable low level subcommands. If so, step 128 sends the startable low level subcommands to drive control program 30 or to a peer drive and updates their status from startable to started. If step 126 determines that the selected TCB contains no startable low level subcommands or when step 128 is completed, step 130 determines if active TCB list 52 is exhausted (selected TCB is the end of active TCB list 52). If not, step 124 is performed again. If so, step 114 ends and control returns to step 100 (FIG. 7) for processing high level commands.

The present invention having been thus described with particular reference to the preferred forms thereof, it will be obvious that various changes and modifications may be made therein without departing from the spirit and scope of the present invention as defined in the appended claims.

What is claimed is:

1. A method of operating a disk drive controller for processing high level commands provided by a host computer, at least one of said high level commands requiring a read and/or a write of data to a local disk drive and a peer disk drive, each of said disk drives including a command execution means for executing low level commands, said method comprising:

(a) forming a task control block for each of said high level commands received from said host computer, each of said high level commands containing command information that includes a high level command type, each of said task control blocks enabling access to low level subcommands for the high level command type, wherein each of said task control blocks is enqueued in an active task control block list;

(b) selecting a next one of said task control blocks from said list;

(c) determining if any of the low level subcommands of the selected task control block are startable;

(d) starting said low level subcommands that step (c) determined as startable; and (e) repeating steps (b) through (d) for other task control blocks formed by step (a) until said list is exhausted, thereby processing the task control blocks in said list concurrently.

2. The method of claim 1, wherein the task control block for each of the high level commands includes a field that designates for each low level subcommand whether, as a prerequisite for starting execution thereof, execution of any other low level subcommand must be completed.

3. The method of claim 2, wherein a first low level subcommand requires a read/write operation on the local disk drive and a second low level subcommand requires a read/write operation on the peer disk drive.

4. The method of claim 3, wherein the second low level subcommand is a third party exclusive OR operation that forms parity data.

5. The method of claim 2, wherein said field further indicates an order of execution of all of said low level subcommands of said selected task control block.

6. The method of claim 1, and further comprising the step of removing the task control block of a completed high level command from the TCB list.

7. The method of claim 1, wherein each task control block contains a status of each of its low level subcommands, said status including the status conditions of wait, startable, started and completed; and further comprising:
   (f) posting status conditions for each of the low level subcommands by updating the status in the respective task control blocks.

8. The method of claim 1, wherein the command information includes the identity of the peer drive, wherein step (a) inserts said identity into said task control blocks, and wherein step (c) presents a second low level subcommand to the peer drive identified by the command information.

9. The method of claim 1, wherein said high level commands are selected from the group consisting of: XDWRITE EXTENDED, XPWRITE, REGENERATE AND REBUILD.

10. The method of claim 1, wherein processing by one or more of steps (a) through (d) of a received high level command that has a conflict with a task control block in said list is deferred until said conflict is removed.

11. The method of claim 1, further comprising the step of notifying said host computer that a received high level command has been completed when all of the low level subcommands thereof have been executed.

12. The method of claim 1, wherein first and second ones of the subcommands of said selected task control block are presented to the local disk drive and the peer disk drive, respectively.

13. A disk drive controller that receives high level commands from a host computer for performing read and/or write operations to a local disk drive and to a peer disk drive, each of said disk drives including a command execution means for executing low level commands, said controller comprising:
   a processor and a memory;
   a task manager program stored in the memory, said task manager program controlling the processor to perform the following steps:
      (a) forming a task control block for each of said high level commands received from said host computer, each of said high level commands containing command information that includes a high level command type, each of said task control blocks enabling access to low level subcommands for the high level command type, wherein each of said task control blocks is enqueued in an active task control block list;
      (b) selecting a next one of said task control blocks from said list;
      (c) determining if any of the low level subcommands of the selected task control block are startable;
      (d) starting said low level subcommands that step (c) determined as startable; and
      (e) repeating steps (b) through (d) for other task control blocks formed by step (a) until said list is exhausted, thereby processing the task control blocks in said list concurrently.

14. The controller of claim 13, wherein the task control block for each of the high level commands includes a field that designates for each low level subcommand whether, as a prerequisite for starting execution thereof, execution of any other low level subcommand must be completed.

15. The controller of claim 14, wherein a first low level subcommand requires a read/write operation on the local disk drive and a second low level subcommand requires a read/write operation on the peer disk drive.

16. The controller of claim 15, wherein the second low level subcommand is a third party exclusive OR operation that forms parity data.

17. The controller of claim 14, wherein said field further indicates an order of execution of all of said low level subcommands of said selected task control block.

18. The controller of claim 13, wherein said task manager program controls said processor to further perform the step of removing the task control block of a completed high level command from the TCB list.

19. The controller of claim 13, wherein each task control block contains a status of each of its low level subcommands, said status including the status conditions of wait, startable, started and completed; and further comprising:
   (f) posting status conditions for each of the low level subcommands by updating the status in the respective task control blocks.

20. The controller of claim 13, wherein the command information includes the identity of the peer drive, wherein step (a) inserts said identity into said task control blocks, and wherein step (c) presents a second low level subcommand to the peer drive identified by the command information.

21. The controller of claim 13, wherein said high level commands are selected from the group consisting of: XDWRITE EXTENDED, XPWRITE, REGENERATE AND REBUILD.

22. The controller of claim 13, wherein processing by one or more of steps (a) through (d) of a received high level command that has a conflict with a task control block in said list is deferred until said conflict is removed.

23. The controller of claim 13, further comprising the step of notifying said host computer that a received high level command has been completed when all of the low level subcommands thereof have been executed.

24. The controller of claim 13, wherein first and second ones of the subcommands of said selected task control block are presented to the local disk drive and the peer disk drive, respectively.

25. A memory media for operation in conjunction with a processor for controlling a local disk drive and a peer disk drive, the processor receiving high level commands from a host computer, each of said high level commands requiring a read and/or a write of data to the local disk drive and the peer disk drive, each of said disk drives including a command execution means for executing low level commands, said memory media comprising:
   means for controlling said processor to perform the steps of:
      (a) forming a task control block for each of said high level commands received from said host computer, each of said high level commands containing command information that includes a high level command type, each of said task control blocks enabling access to low level subcommands for the high level command type, wherein each of said task control blocks is enqueued in an active task control block list;

(b) selecting a next one of said task control blocks from said list;

(c) determining if any of the low level subcommands of the selected task control block are startable;

(d) starting said low level subcommands that step (c) determined as startable; and (e) repeating steps (b) through (d) for other task control blocks formed by step (a) until said list is exhausted, thereby processing the task control blocks in said list concurrently.

26. The memory media of claim 25, wherein the task control block for each of the high level commands includes a field that designates for each low level subcommand whether, as a prerequisite for starting execution thereof, execution of any other low level subcommand must be completed.

27. The memory media of claim 26, wherein a first low level subcommand requires a read/write operation on the local disk drive and a second low level subcommand requires a read/write operation on the peer disk drive.

28. The memory media of claim 27, wherein the second low level subcommand is a third party exclusive OR operation that forms parity data.

29. The memory media of claim 26, wherein said field further indicates an order of execution of all of said low level subcommands of said selected task control block.

30. The memory media of claim 25, said means for controlling controls said processor to further perform the step of removing the task control block of a completed high level command from the TCB list.

31. The memory media of claim 25, wherein each task control block contains a status of each of its low level subcommands, said status including the status conditions of wait, startable, started and completed; and further comprising:

(f) posting status conditions for each of the low level subcommands by updating the status in the respective task control blocks.

32. The memory media of claim 25, wherein the command information includes the identity of the peer drive, wherein step (a) inserts said identity into said task control blocks, and wherein step (c) presents a second low level subcommand to the peer drive identified by the command information.

33. The memory media of claim 25, wherein said high level commands are selected from the group consisting of: XDWRITE EXTENDED, XPWRITE, REGENERATE AND REBUILD.

34. The memory media of claim 25, wherein processing by one or more of steps (a) through (d) of a received high level command that has a conflict with a task control block in said list is deferred until said conflict is removed.

35. The memory media of claim 25, further comprising the step of notifying said host computer that a received high level command has been completed when all of the low level subcommands thereof have been executed.

36. The memory media of claim 25, wherein first and second ones of the subcommands of said selected task control block are presented to the local disk drive and the peer disk drive, respectively.

* * * * *